UNITED STATES PATENT OFFICE 2,408,656

PROCESS FOR PRODUCING SILICIC ACID SOLS

Joseph S. Kirk, Seven Hills Village, Ohio, assignor to E. I. du Pont de Nemours & Company, Wilmington, Del., a corporation of Delaware No Drawing. Application April 27, 1943, Serial No. 484,768

6 Claims. (Cl. 252—309)

This invention relates to silicic acid sols, is more particularly directed to compositions comprising complexes of low molecular weight polysilicic acid and alcohols having at least two carbon atoms per hydroxyl, the complexes being substantially salt-free and having a pH below 3.0, and is further directed to processes for producing such complexes in which an alcohol-polysilicic acid complex is formed in solution by mixing with an aqueous, low molecular weight polysilicic acid solution an alcohol having at least two carbon atoms per hydroxyl, the amount of alcohol used being not more than the amount which permits a water-soluble salt to dissolve in the solution and not less than the amount which, when the solution is saturated by dissolving such a salt, causes formation of a separate, alcohol-rich, polysilicic acid-containing phase distinct from the remainder of the solution, and the alcohol-polysilicic acid complex is separated from the solution.

Silicic acid sols and gels are ordinarily prepared by the treatment of an aqueous silicate solution with a suitable acid. As a usual thing, sodium silicate is treated with sulfuric or hydrochloric acid. Sols and gels thus prepared contain salts as impurities and additionally contain an excess of water. While considerably more expensive, silicic acid sols and gels can be prepared by the hydrolysis of silicic acid esters such as ethyl silicate or they may be prepared from silicon halides such as silicon fluoride or silicon tetrachloride. Silicic acid sols, however prepared, set rather quickly to a gel. The usefulness of such sols is accordingly limited since for many purposes they must be freshly prepared at the time of use. The conversion of the silicic acid sol to a gel is accompanied by changes in physical and chemical properties, and difficulty is experienced in using such sols for any purpose in which these properties are at all critical.

Silicic acid sols are highly active chemically, and this property makes them poorly suited to some uses. Silicic acid sols are hardly suitable as tanning agents, for instance because of their rapid and astringent action upon skins.

It is an object of the present invention to provide silicic acid sols of improved physical and chemical properties and to provide processes for their production. A further object is to provide silicic acid sols substantially free from salt impurities and containing only a limited amount of water and to provide processes for producing such sols. Another object is to provide processes in which silicic acid sols, particularly complexes of low molecular weight polysilicic acid and alcohols having at least two carbon atoms per hydroxyl, are separated out from aqueous solutions. Another object is to provide processes whereby such separation is accomplished by salting out the polysilicic acid-alcohol complexes. Other objects of the invention will appear hereinafter.

The foregoing and other objects of this invention are accomplished by processes in which an alcohol-polysilicic acid complex is formed in solution by mixing with an aqueous, low molecular weight polysilicic acid solution an alcohol having at least two carbon atoms per hydroxyl, the amount of alcohol used being not more than the amount which permits a water-soluble salt to dissolve in the solution and not less than the amount which, when the solution is saturated by dissolving such a salt, causes formation of a separate, alcohol-rich, polysilicic acid-containing phase distinct from the remainder of the solution, and separating the complex from the remainder of the solution, and are further accomplished by the substantially salt-free alcohol-polysilicic acid complexes having a pH below about 3.0, which are produced according to such processes.

The term "silicic acid sol" is used in a generic sense in describing this invention to include aqueous dispersions or solutions of silicic acid. Ordinarily the silicic acid in a silica sol will be in a polymerized condition and therefore is referred to as polysilicic acid. If the degree of polymerization is relatively small the polysilicic acid has a low molecular weight.

The silicic acid sols formed by the inclusion of an alcohol have novel physical and chemical character. The sols are of increased stability. The sols are more suitable for paper coating, for instance, by reason of the presence of the alcohol, and their improved chemical and physical characteristics similarly increase their suitability for many purposes.

The nature of the combination between silicic acid and an alcohol may logically be explained on the basis of hydrogen bonding. Hydrogen bonding is a concept advanced in recent years to to explain certain abnormalities in the chemical and physical behavior of mixtures of compounds one of which contains hydrogen attached to a strongly negative radical and the other an atom capable of donating a pair of electrons to form a directional or coordination bond. Since the bond is formed by the donation of an electron pair from one atom, the donor, to the other atom, the bond is not of the type conceived of as an ordinary valence bond but many of the properties of the mixture indicate that a type of chemical compound is formed. These mixtures, for instance, exhibit an abnormal vapor pressure lowering, that is, a deviation from Raoult's law. There is further observed abnormal heats of mixing and abnormal deviation in viscosity and freezing point lowering.

I have found that when silicic acid is mixed with an alcohol it exhibits characteristics unexplainable upon the basis of ordinary chemical reaction and unexpected from a consideration of the characteristics of the materials mixed. Apparently silicic acid has an acceptor hydrogen atom and forms some type of compound with a hydrogen bonding donor such as an alcohol. Among the characteristics of these silicic acid-hydrogen bonding donor combinations is a decreased tendency to precipitate gelatin and an increase in the time required for the sol to be converted to the gel.

It will be understood that in advancing the theory of hydrogen bonding to explain the unexpected results of the present invention I do not intend to be limited or restricted by this theory. The theory may or may not be correct and for the purposes of the present invention it is of importance largely because, whatever the reason, alcohols, which may function as hydrogen bonding donors, profoundly modify silicic acid sols and gels.

Silicic acid sols which are separated out in conjunction with an alcohol according to a process of the present invention may be prepared according to any of the processes known to the art for the preparation of silica sols. In a typical process a sodium silicate solution is added with effective mixing to a solution of acid which contains an alcohol, the amounts of silicate and acid being so selected as to produce a silica sol. By effective mixing is meant that the reactants are brought together under conditions such that no substantial local concentration of one or the other is present at the point of mixing or thereafter.

Silicic acid sols may be prepared in still other manners and they may be made, for instance, from silicic acid esters, partially hydrolyzed esters of silicic acid, and silicon halides. Typical of such methods of preparation are the following:

*From methyl silicate.*—Method described by Grimaux, Compt. rend. 98, 105 (1884); 98, 1434 (1884). According to my modification of this method, sols may be prepared by stirring methyl silicate with a sufficient quantity of water so that there are say 5 parts of $SiO_2$ per 100 parts of the mixture. The addition of sufficient acid to lower the pH to about 1 or 2 accelerates the rate of hydrolysis of the methyl silicate and increases the stability of the silicic acid in a low molecular weight state.

*From silicon tetrachloride.*—E. C. Williams, U. S. Patent 1,539,342. Silicon tetrachloride is stirred into water with agitation and in such proportion as to give a solution of silicic acid which gels on standing. One method of carrying out this reaction would be to run silicon tetrachloride in a thin stream into a slightly acidified mixture of water and ice until, for example, the mixture contains 4 per cent by weight of $SiO_2$. The excess acidity is then neutralized with alkali such as 20 per cent NaOH solution with violent stirring as the alkali is added, until a pH of 1 or 2 is reached.

*From silicon sulfide.*—Fleury, U. S. Patent 61,931. By stirring silicon sulfide with water, a solution of silicic acid can be obtained with the simultaneous evolution of hydrogen sulfide.

*By electro-osmosis of sodium silicate solution.*—Schwerin, U. S. Patent 1,132,394. A dilute solution of sodium silicate is subjected to electro-osmosis, the silicic acid being obtained as a solution in the anode compartment.

*By the electrolysis of sodium silicate with a mercury cathode.*—N. L. Collins, U. S. Patent 1,562,940. By electrolyzing a solution of sodium silicate in a cell fitted with a lead anode and mercury cathode, there is obtained a solution of silicic acid. By adding a small quantity of salt, such as sodium chloride, to the solution just before hydrolysis, the stability of the silicic acid would be increased by virtue of the small amount of hydrochloric acid thereby formed at the anode.

According to the preferred practices of the present invention there is used for making the silica sol a method which is adaptable to giving an appreciable concentration of low molecular weight polysilicic acid in the sol. By the reaction of sodium silicate with an acid, for instance, sols may easily be produced containing up to fifteen per cent or more of low molecular weight polysilicic acid, and such sols may be used very economically. However, sols containing as low as three per cent polysilicic acid may, under some conditions, be used to advantage, while for greatest facility of operation a sol containing about from six to twelve per cent of polysilicic acid is preferred.

The polysilicic acid sol, during its preparation and thereafter, should be kept at a relatively low pH—that is, at a pH below about 3.0. For best results the pH of the sol should not be allowed to rise above about 2.5 nor fall below about 0.25. The processes of the present invention are uniquely adapted to using such an acid sol and this acid character of the sol persists in the alcohol-polysilicic acid complexes which are ultimately separated out.

Polymerization starts to occur in silicic acid sols as soon as the sols are prepared and normally proceeds until a typical silica gel structure has been formed. According to the present invention, silicic acid-alcohol complexes are separated out before such polymerization has proceeded to completion. Compared with silica gels, the silicic acid in the sols to which the alcohol is added has relatively low molecular weight, but it will be understood that the silicic acid is not monomeric. It is ordinarily satisfactory if the alcohol is added to a silicic acid sol in which the molecular weight of the silicic acid is not substantially greater than that in a silicic acid sol which does not exhibit evidence of gelling. Such gelling will be recognized by a decrease in pourability, an increase in apparent viscosity, an apparent lack of physical homogeneity, and other similar changes in the chemical and physical properties of the sol.

According to the present invention low molecular weight polysilicic acid solutions, otherwise known as "silica sols," obtained by procedures such as those above described and others, are used with alcohols having at least two carbon atoms per hydroxyl to form alcohol-polysilicic acid complexes.

To be useful such an alcohol should not contain groups which will react with silicic acid to give compounds or precipitates of the conventional sort when such reaction would interfere with the hydrogen bonding activity of the alcohol. It is further to be noted that while some alcohols produce water-insoluble complexes it is often preferred to use only those alcohols which do not lead to any type of precipitate.

The alcohols used in the processes and compositions of this invention have at least two carbon atoms per hydroxyl. Thus, a monohydric alcohol, to be suitable, should have at least two carbon atoms, a dihydric alcohol should have a total of at least four carbon atoms, and a trihydric alcohol should have at least six carbon atoms. The suitability of other polyhydric alcohols may be determined on a similar basis.

By far the best results are obtained by using alcohols which are at least somewhat water-soluble. It is particularly preferred to use alcohols which are completely miscible with water, such as ethanol, normal propanol, isopropanol, and tertiary butanol. Of the water-miscible alcohols, the monohydric alcohols have a three-membered carbon chain, namely, normal propanol, isopropanol, and tertiary butyl alcohol, may be used with particular facility. It will be understood that mixtures of alcohols may also be used.

Alcohols effective as hydrogen bonding agents for use with silicic acid according to the present invention may be either monohydric or polyhydric donors of this class, and in addition to containing an alcohol group, may if desired also contain other groups such as ketone or ether groups.

Examples of alcohols which may be used are the following:

Ethanol
N-propanol
Isopropanol
N-butyl alcohol
Isobutyl alcohol
Secondary butyl alcohol
Tertiary butyl alcohol
Iso amyl alcohol
Tertiary amyl alcohol
Cyclohexanol
2-Methyl-2,4-pentanediol
Pinacol
Hexamethylene glycol
Penta glycol
Tetrahydroxy octane
1,1,1-trimethylol ethane
Propanediol
Diacetone alcohol The proportion of alcohol to polysilicic acid used in any particular instance depends upon such factors as the nature of the alcohol, its solubility in water and in salt solutions, the molecular weight of the polysilicic acid, and the concentration of polysilicic acid in the solution used. The amount used must be not more than an amount which permits a water-soluble salt, such as sodium chloride or sodium sulfate, to dissolve in the solution and not less than an amount which, when the solution is saturated by dissolving such a salt, causes formation of a separate, alcohol-rich, polysilicic acid-containing phase distinct from the remainder of the solution. A few simple tests with the particular alcohol and polysilicic acid solution to be used will reveal the proportion of alcohol required to meet these limitations. Thus, a sample of the polysilicic acid solution to which alcohol is being added may be drawn off and tested by adding a soluble salt such as sodium chloride. As long as the salt dissolves, too much alcohol has not been added. On the other hand, if sufficient sodium chloride is dissolved in the sample to saturate it, a separate alcohol-rich, polysilicic acid-containing phase will form in the mixture when a sufficient amount of alcohol has been added. By making such tests at intervals during the addition of an alcohol to a polysilicic acid solution the optimum amount of alcohol to use will be readily apparent.

When a water-miscible alcohol, such as tertiary butyl alcohol, is used, a weight of alcohol equal to about from two to six times the weight of polysilicic acid, calculated as $SiO_2$, preferably will be employed. The particular proportion within this range should be selected with reference to the concentration of polysilicic acid in the solution to which the alcohol is being added, and will be near the lower limit for relatively concentrated solutions of polysilicic acid containing, say, fifteen per cent $SiO_2$, and near the upper limit for dilute polysilicic acid solutions containing, say, three per cent $SiO_2$.

The separation of the alcohol silicic acid complex may be accomplished by any suitable method as, for instance, by drying with chemical drying agents such as anhydrous sodium sulfate. A preferred method for separating an alcohol-polysilicic acid complex from excess water according to a process of this invention comprises salting out the complex as a phase separate from the water-containing phase. Salting out methods have previously been employed in the art for such purposes as removing dyes from solutions during the course of their manufacture. The technique comprises adding a suitable non-reactive salt to the solution in such proportions that the solution becomes saturated or nearly saturated with the salt.

The amount of salt added to a silicic acid sol containing an alcohol according to this invention should be sufficient to cause the alcohol-polysilicic acid complex to form as a separate phase. Ordinarily a substantial concentration of the salt is used, although this may vary with such factors as the concentration of the silicic acid and the choice of the alcohol. In any event the concentration of salt should be considerably more than is achieved, for instance, by neutralizing a sodium silicate solution with an acid. Ordinarily it will be preferred to saturate the solution with the salt.

The material used to effect salting out in the present processes should of course be chemically non-reactive with the alcohol or the silicic acid. The particular salt chosen should be used at such a pH that the corresponding metal silicate is not formed. Ordinarily such metal silicates will not form below pH 2.0. Fluorides operate as salting-out agents but simultaneously accelerate the gelling of silicic acid sols and their use is therefore avoided. While a variety of salts may be used, such as potassium chloride, potassium sulfate, potassium bromide, calcium chloride, zinc chloride, magnesium sulfate, magnesium chloride, copper sulfate, ammonium chloride, ammonium sulfate, barium chloride, sodium nitrate, sodium sulfamate, ferrous sulfate, and ferric chloride, it is preferred with most alcohols to use sodium chloride or sodium sulfate because of their low cost and non-reactivity with silicic acid and with alcohols.

The complexes of silicic acid and alcohols separated out according to this invention are liquids of novel character. They have a pH below 3.0, and the preferred compositions have a pH of about from 0.25 to 2.50. They contain a minor proportion by weight, of water, the proportion of water to silicic acid being less than that heretofore known in silicic acid sols. It is preferred that this minor proportion of water should be not more than a relatively small fraction of the total weight of the sol, usually being less than from one tenth to one fifth of the total. Most desirably, the sols should be substantially free of uncombined water, and to accomplish this condition they may be dried, as, for instance, by means of desiccants.

The sols have a chemical stability as sols much greater than that of silicic acid sols prepared according to methods heretofore available. They may be diluted with suitable materials, preferably of the hydroxylated type, and for this purpose primary alcohols, for instance, such as methanol, ethanol, and normal butanol are well adapted, and such dilution may serve to improve the stability of the sols during extended storage periods.

Silicic acid sols containing alcohols, which have been separated out according to processes of the present invention, may be used for various of the purposes for which sodium silicate and silicic acid acid sols and gels have heretofore been used. Silicic acid sols prepared according to the present invention may be used with particular advantage in tanning. In addition to their use for tanning skins the sols may be employed for tanning any protein and thus may be used, for instance, for tanning or precipitation of gelatin for the preparation of photographic films and similar films using gelatin coatings. The sols may be found suitable for use in textile treatments and they may be used for treating wool as a dye substantive. They may be used for the treatment of cotton fibers, silk, rayon, or nylon for weighting, sizing, and stiffening. Sols prepared according to the present invention may also find application in the preparation of paper, and they may be used in the pulp to increase the wet strength, and they may be used for filling and stiffening the paper product. In such use they may of course be supplemented by aluminum, calcium or magnesium salts and by latex, paraffin, and other similar materials customarily used in the art. The sols may be used as rubber fillers being precipitated, for instance, with calcium chloride or magnesium chloride. The silica sols may similarly be used with plastics and resins as fillers or as coating agents and they may be used in combination with film-forming compositions to assist and modify them.

Silica sols prepared according to this invention may similarly find application in fireproofing and the like and they may advantageously be used with complex amine derivatives as fire retardants. They may be used in coating and paint compositions together with clay, pigments, or other paint ingredients in customary fashion. They are particularly adapted for use in paints containing protein because the film upon drying becomes insolubilized and the protein is tanned.

Silica sols prepared according to the present invention may be used for coating metals, particularly such metals as magnesium and aluminum. They may be used as emulsifying agents; they may be used for the treatment of glass fibres for a matting and as a dye substantive. They may be baked on glass to activate the surface and for coating. The silica sols may be used as adhesives and cements. They may be used as a binding agent for rock wool. For such uses they may advantageously be combined with other metals.

The silica gels prepared by gelling of the silicic acid sols prepared according to this invention may be dried as a catalyst support and may be employed for other purposes for which silica gels are used in the art.

The practices of the present invention may be better understood by reference to the following illustrative examples:

Example I

A silicic acid sol was prepared in the following manner:

To 816 parts by volume of water was added 429 parts by volume of 4.5 normal hydrochloric acid solution. To this solution there was added with vigorous agitation 1755 parts by volume of a sodium silicate solution which was 1.70 molar with respect to $SiO_2$ and in which the sodium silicate had an $SiO_2:Na_2O$ weight ratio of 3.25. A sol was obtained which had a pH of 2.5. This sol was permitted to age for 50 minutes at 26° C. There was then added 4.5 normal hydrochloric acid solution with stirring until the pH of the mixture had been lowered to 1.7. There was thus obtained about 3000 parts by volume of low molecular weight polysilicic acid solution.

To 400 parts by volume of the polysilicic acid solution there was added 80 parts by volume of normal propanol and the mixture was stirred well for five minutes. To the mixture was then added 120 parts by weight of sodium chloride and the mixture was stirred for 10 minutes. The mixture was then allowed to separate gravitationally for about 50 minutes. After this time the mixture had settled into two layers.

The lower of these two layers was found to contain salt and water, together with some silicic acid. The upper layer, 51.6 parts by volume, had a pH of 2.5 and consisted essentially of normal propanol associated with a substantial amount of polysilicic acid as a complex, the proportion of polysilicic acid being 10.1 per cent by weight expressed as $SiO_2$.

The polysilicic acid in the complex was found to be relatively stable against polymerization during standing, being ungelled even after several days storage. As prepared and even after prolonged standing the solution was a clear, mobile liquid which had a true viscosity and gave no evidence of thixotropy.

Example II

To 400 parts by volume of polysilicic acid solution prepared as described in Example I, and having a pH of 1.7, there was added 80 parts by volume of isopropanol. The mixture was stirred well for five minutes, 120 parts by weight of sodium chloride was added and the mixture was stirred for ten minutes, after which it was allowed to settle by gravitation.

After standing for fifty minutes, the mixture was found to have separated into two layers. The lower layer contained salt, water and some silicic acid. The upper layer, comprising 11 parts by volume, had a pH of 1.7, and contained isopropanol associated with substantial amount of polysilicic acid as a complex, the proportion of polysilicic acid comprising 23.2 per cent by weight, expressed as $SiO_2$. The upper layer contained no substantial amount of salt. It was a clear, mobile liquid having a true viscosity and exhibiting no evidence of thixotropy. It was relatively stable upon storage and did not gel upon standing for several days.

Example III

To 400 parts by volume of a polysilicic acid solution prepared as described in Example I and having a pH of about 1.7, there was added 80 parts by volume of tertiary butyl alcohol. The mixture was stirred for five minutes, 120 parts by weight of sodium chloride was added, and the mixture was stirred for ten minutes after which it was allowed to stand and settle by gravitation for about fifty minutes.

It was found that the mixture separated into two layers. The lower layer contained water, salt and some of the silicic acid and tertiary butyl alcohol. The upper layer contained tertiary butyl alcohol and polysilicic acid, associated as a complex, no substantial amount of salt, and only a minor proportion of water. The complex layer was a clear mobile liquid comprising 52 parts by volume and contained 11.5 parts by weight of low molecular weight polysilicic acid expressed as $SiO_2$. This liquid was relatively stable on storage, exhibiting true viscosity and no evidence of thixotropy even after standing for several days.

Example IV

To 1150 parts by weight of water there was added 782 parts of a commercial sodium silicate solution containing sodium silicate equivalent to 28.5 per cent by weight and having an $SiO_2:Na_2O$ weight ratio of 3.25. This mixture was stirred until homogeneous and the temperature was adjusted to 25° C. In a separate tank 142.5 parts by weight of commercial 66° Bé. sulfuric acid, containing 93.2% $H_2SO_4$, was added to 1638 parts by weight of water and the solution was mixed until homogeneous and cooled to 5° C. The diluted sodium silicate solution and the diluted sulfuric acid were then brought together from separate blow cases into a jet mixer, the two streams being forced together under such conditions that they were mixed practically instantaneously with no local concentration of either reactant being present at any time in the mixing chamber. There was thus obtained 3712.5 parts by weight of a silica sol which by analysis was found to contain low molecular weight polysilicic acid in solution equivalent to 6% by weight of $SiO_2$. The sol had a pH of 1.7 and the temperature immediately after mixing was about 20° C.

To this silica sol there was then added 1239 parts by weight of tertiary butyl alcohol. There was then added 0.6 part by weight of gelatin as a 2% solution in order to precipitate out any high molecular weight polysilicic acid present. This mixture was agitated for 10 minutes, and then allowed to age for thirty minutes. There was then added 1113 parts by weight of sodium chloride and the mixture was again agitated for 10 minutes, during which time the salt dissolved and a tertiary butyl alcohol-low molecular weight polysilicic acid complex was salted out as a separate liquid phase. The mixture was then allowed to stand quiescent and the two liquid phases separated by gravitation, the alcohol-silicic acid complex rising to the top as an upper layer. During this settling period the gelatin in combination with any high molecular weight polysilicic acid rose to the surface and was skimmed off. The upper layer of complex was then decanted off.

There was obtained in the upper layer 1438 parts by weight of tertiary butyl alcohol-polysilicic acid complex which had a pH of 1.7 and contained 12% by weight of free water and low molecular weight polysilicic acid equivalent to 9% of $SiO_2$ by weight. This complex was relatively stable on storage and exhibited no evidence of gelling even after several days standing.

While in the foregoing description of this invention there have been shown certain illustrative processes, it will be understood that one skilled in the art may readily separate out silicic acid containing an alcohol in various ways without departing from the spirit of my invention.

This application is a continuation in part of my application Ser. No. 439,547, filed April 18, 1942.

I claim:

1. In a process for producing a liquid alcohol-polysilicic acid complex having a pH below about 3.0 and containing not more than about 20 per cent by weight of water the steps comprising mixing with an aqueous, polysilicic acid solution exhibiting no evidence of gelling and having a pH below about 3.0, a liquid alcohol having at least two carbon atoms per hydroxyl, the amount of alcohol used being not more than the amount which permits a water-soluble salt to dissolve in the solution and not less than the amount which, when the solution is saturated by dissolving such a salt, causes formation of a separate alcohol-rich, polysilicic acid-containing phase distinct from the remainder of the solution, whereby an alcohol-polysilicic acid complex is formed in solution, saturating the resulting solution with sodium chloride, whereby the alcohol-polysilicic acid complex forms a separate phase, and separating the complex-containing phase from the remainder of the solution.

2. In a process for producing a liquid alcohol-polysilicic acid complex having a pH below about 3.0 and containing not more than about 20 per cent by weight of water, the steps comprising mixing tertiary butyl alcohol with an aqueous, polysilicic acid solution exhibiting no evidence of gelling and having a pH below about 3.0, the amount of tertiary butyl alcohol used being not more than the amount which permits sodium chloride to dissolve in the solution and not less than the amount which, when the solution is saturated by dissolving sodium chloride, causes formation of a separate tertiary butyl alcohol-rich, polysilicic acid-containing phase distinct from the remainder of the solution, salting out the tertiary butyl alcohol-polysilicic acid complex to form a separate phase, and separating the salted-out phase from the remainder of the solution.

3. In a process for producing a liquid alcohol-polysilicic acid complex having a pH below about 3.0 and containing not more than about 20 per cent by weight of water, the steps comprising mixing tertiary butyl alcohol with an aqueous solution exhibiting no evidence of gelling, having a pH below about 3.0, and containing polysilicic acid equivalent to about from three to fifteen per cent by weight of $SiO_2$, the weight of tertiary butyl alcohol used being about from two to six times the weight of polysilicic acid calculated as $SiO_2$, whereby a tertiary butyl alcohol-polysilicic acid complex is formed in solution, saturating the resulting solution with sodium chloride, whereby the complex forms a separate phase, and separating the complex-containing phase from the remainder of the solution.

4. In a process for producing a liquid alcohol-polysilicic acid hydrogen-bonded complex having a pH below about 3.0 and containing not more than about 20 per cent by weight of water, the steps comprising mixing an aqueous polysilicic acid solution exhibiting no evidence of gelling and having a pH below about 3.0, and a liquid alcohol having at least two carbon atoms per hydroxyl group, the amount of alcohol used being not more than the amount which permits a water-soluble salt to dissolve in the solution and not less than the amount which, when the solution is saturated by dissolving such a salt, causes formation of a separate, alcohol-rich polysilicic acid-containing phase distinct from the remainder of the solution, whereby an alcohol-polysilicic acid hydrogen-bonded complex is formed in solution, salting out the hydrogen-bonded complex to form a separate phase by adding a salt which is non-reactive with the alcohol and the silicic acid, the pH being such that the metal silicate corresponding to the salt is not formed, and separating the salted-out phase from the remainder of the solution.

5. In a process for producing a liquid alcohol-polysilicic acid hydrogen-bonded complex having a pH below about 3.0 and containing not more than about 20 per cent by weight of water, the steps comprising mixing an aqueous polysilicic acid solution exhibiting no evidence of gelling and having a pH below about 3.0, and a liquid alcohol having at least two carbon atoms per hydroxyl group, the amount of alcohol used being not more than the amount which permits a water-soluble salt to dissolve in the solution and not less than the amount which, when the solution is saturated by dissolving such a salt, causes formation of a separate, alcohol-rich polysilicic acid-containing phase distinct from the remainder of the solution, whereby an alcohol-polysilicic acid hydrogen-bonded complex is formed in solution, saturating the resulting solution with a water-soluble salt non-reactive with the alcohol and the silicic acid, the pH being such that the metal silicate corresponding to the salt is not formed, whereby the alcohol-polysilicic acid hydrogen-bonded complex forms a separate phase, and separating the complex-containing phase from the remainder of the solution.

6. In a process for producing a liquid alcohol-polysilicic acid hydrogen-bonded complex having a pH below about 3.0 and containing not more than about 20 per cent by weight of water, the steps comprising mixing an aqueous polysilicic acid solution exhibiting no evidence of gelling and having a pH below about 3.0, and tertiary butyl alcohol, the amount of alcohol used being not more than the amount which permits a water-soluble salt to dissolve in the solution and not less than the amount which, when the solution is saturated by dissolving such a salt, causes formation of a separate, alcohol-rich, polysilicic acid-containing phase distinct from the remainder of the solution, whereby an alcohol-polysilicic acid hydrogen-bonded complex is formed in solution, saturating the resulting solution with a water-soluble salt which is non-reactive with silicic acid and tertiary butyl alcohol, whereby the hydrogen-bonded complex forms a separate phase, and separating the complex-containing phase from the remainder of the solution.

JOSEPH S. KIRK.